United States Patent [19]

Katayama et al.

[11] Patent Number: 5,570,499

[45] Date of Patent: Nov. 5, 1996

[54] BOLT-TIGHTENED TYPE COUPLING

[75] Inventors: Rakuzo Katayama, Hiratsuka; Michio Kyoya; Tokushi Koumaru, both of Sagamihara, all of Japan

[73] Assignees: The Yokohama Rubber Co., Ltd; Mitsubishi Jukogyo Kabushiki Kaisha, both of Tokyo, Japan

[21] Appl. No.: 362,864

[22] Filed: Dec. 23, 1994

[30] Foreign Application Priority Data

Dec. 27, 1993 [JP] Japan ................ 5-070223 U

[51] Int. Cl.$^6$ ........................... F16L 33/06
[52] U.S. Cl. ................ 24/285; 24/279; 411/116; 411/974
[58] Field of Search ................ 24/20 LS, 279–282, 24/284–286; 411/116, 166, 191, 974

[56] References Cited

U.S. PATENT DOCUMENTS

| 85,392 | 12/1868 | McCullaugh | 24/285 |
| 2,042,263 | 5/1936 | La Valley | 24/279 |
| 2,318,946 | 5/1943 | Kass | 24/282 |
| 2,710,207 | 6/1955 | Mueller | 24/279 X |
| 3,378,288 | 4/1968 | Kanas | 411/116 |
| 3,584,353 | 6/1971 | Smith | 24/279 |
| 3,609,826 | 10/1971 | Seabourn | 24/279 |
| 4,585,366 | 4/1986 | Uchida | |

FOREIGN PATENT DOCUMENTS

| 0080708 | 6/1984 | European Pat. Off. |
| 1878229 | 8/1963 | Germany |
| 3330269 | 3/1985 | Germany |

Primary Examiner—James R. Brittain
Attorney, Agent, or Firm—Finnegan, Henderson, Farabow, Garrett & Dunner

[57] ABSTRACT

A bolt-tightened type coupling includes a pair of semi-circular arc-shaped coupling halves having base ends which are pivotably connected to one another, so that the coupling halves can be moved toward each other to a closed position and moved away from each other to an open position. The coupling halves have opposite, free ends providing with flanges, respectively, having bolt inserting holes, respectively. One of the bolt inserting holes has such a shape that a bolt fits tightly with the inner edges of the bolt inserting hole, so that the bolt can be held by the bolt inserting hole.

6 Claims, 3 Drawing Sheets

BOLT-TIGHTENED TYPE COUPLING

BACKGROUND OF THE INVENTION

1. Field of the Invention

This invention relates to a bolt-tightened type coupling which is used to connect pipes, hoses, tubes or the like and, for example, can be used to connect an outlet hose of a turbo-charger to an engine inlet passage. More particularly, this invention relates to a bolt-tightened type coupling comprising a pair of semi-circular coupling halves having one end of each half pivotably connected to one another and the other end of each half mutually connected by means of a bolt and nut, in which the bolt is prevented from being removed, but is stably held by one of the coupling halves to improve productivity and to attain an easy assembly operation.

2. Description of the Related Art

In the prior art, a bolt-tightened type coupling, such as shown in FIG. 1, has been conventionally known and used to connect pipes, hoses, or any separated members.

The known coupling 1 comprises a pair of semi-circular arc-shaped coupling halves 2a and 2b having one end of each half provided with flanges 3a and 3b, respectively, which are pivotably connected to one another by a connecting ring 4, so that these coupling halves 2a and 2b can cooperate to open or close to encircle, for example, a pipe, not illustrated in the drawings. The other ends of the coupling halves 2a and 2b are provided with flanges 5a and 5b, respectively, which have respective bolt inserting holes 6a and 6b, so that a bolt 7 can be inserted through the bolt inserting holes 6a and 6b and engaged with and screwed into a corresponding nut 8.

However, in the conventionally known bolt-tightened type coupling 1 as mentioned above, when the coupling 1 is to be installed, a bolt 7 must be first inserted into the bolt inserting hole 6 of one 2 of the coupling halves 2a and 2b, then the bolt inserting hole 6 of the other coupling half 2 must be placed over the tip of the bolt 7, while the head of the bolt 7 is pushed by the operator's hand, and the nut 8 must then be put on the tip of the bolt 7 to be engaged with and screwed thereto.

Recently, however, an electric nut-screwing machine, sometimes called an "impact wrench" or a "nut driver" is frequently used particularly in a mass-production factory to improve the productivity and increase the speed of the assembly operation. When such an electric machine is used to install a coupling 1, it is very difficult or almost impossible to hold the bolt 7 by hand in a continuous mass-production line, in view of its assembling speed, automatic operation or productivity. Therefore, it is required that the bolt 7 is held by the coupling 1 beforehand.

In view of the above, it has been previously proposed that such a bolt is, beforehand, fixed to one of the coupling halves by a welding or the like. In this case, however, it is very difficult to insert the tip of the bolt into the bolt inserting hole of the other coupling half, since the bolt is immovably fixed to the one of the coupling holes. Therefore, the assembling operation would be very difficult.

It has also been proposed that, using a welding or the like, such a bolt is, beforehand, provisionally mounted on one of the coupling halves. In this case, however, another member is additionally required and it must be mounted on. That is to say, the bolt must be provisionally inserted into the bolt inserting hole and the washer is mounted on the tip of the bolt to provisionally mount the bolt on one of the coupling halves. Therefore, the assembly operation would also be substantially difficult and a reduction in the production cost would be difficult.

SUMMARY OF THE INVENTION

An object of the present invention is to provide a bolt-tightened type coupling which is used to connect pipes, hoses, tubes or the like, in which the bolt is prevented from being removed, but stably held by one of the coupling halves to improve productivity and to attain an easy assembly operation.

According to the present invention, there is provided a bolt-tightened type coupling comprising a pair of first and second semi-circular arc-shaped coupling halves having base ends which are pivotably connected one another, so that said pair of coupling halves can be moved toward each other to its closed position and moved away from each other to its open position; said first and second coupling halves having opposite, free ends providing with first and second flanges, respectively, having first and second bolt inserting holes, respectively; a bolt which is to be inserted from said first bolt inserting hole to said second bolt inserting hole; a nut which is to be engaged with said bolt to fasten the pair of coupling halves to its closed position; and said first bolt inserting hole having such a shape that said bolt tightly fits to inner edges of said hole, by point or linear contact, so that the bolt can be held by said bolt inserting hole.

DESCRIPTION OF THE PREFERRED EMBODIMENTS

Figure 1:
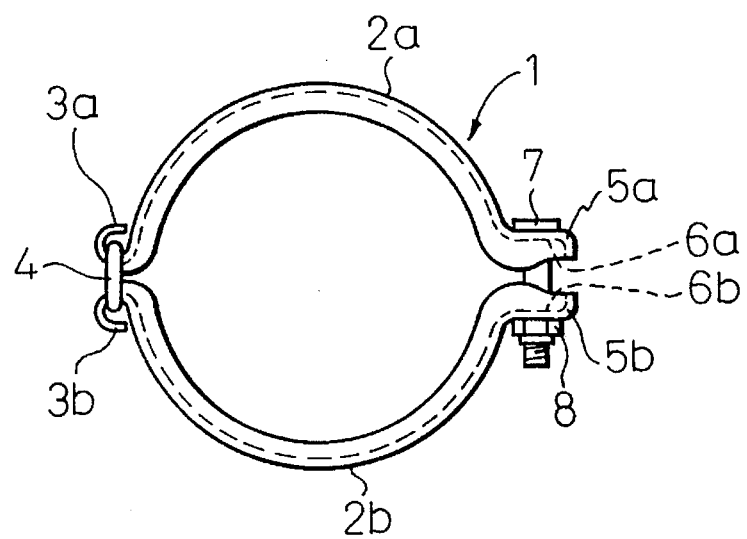
FIG. 1 is a plan view of a bolt-tightened type coupling conventionally known in the prior art and shows its closed position.
Figure 2:
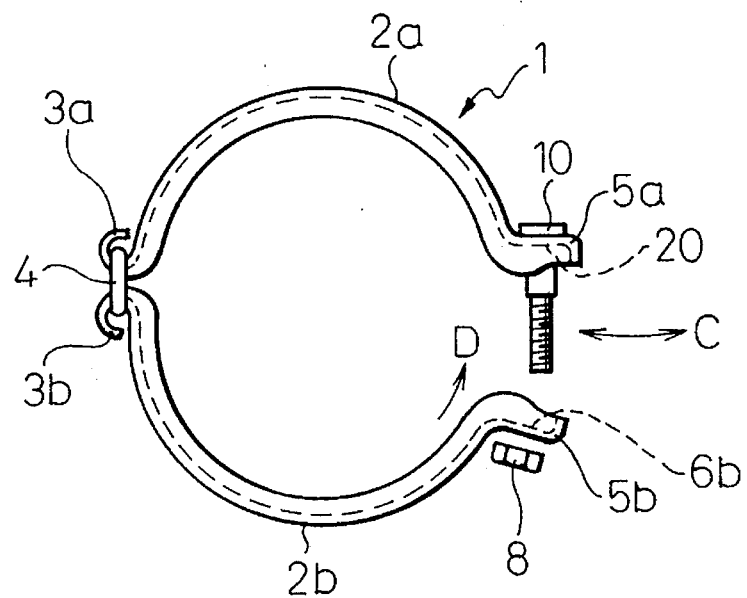
FIG. 2 is a plan view of a bolt-tightened type coupling according to this invention and shows its open position.

In the same manner as in the prior art, a bolt-tightened type coupling according to this invention, generally indicated by a reference numeral 1 as shown in FIG. 2, comprises a pair of first and second semi-circular arc-shaped coupling halves 2a and 2b having base ends thereof providing with flanges 3a and 3b, respectively, which are pivotably connected to one another by a connecting ring 4, so that the pair of coupling halves 2a and 2b can be moved toward each other to its closed position (as shown in FIG. 1) and moved away from each other to its open position as shown in FIG. 2.

The opposite, free ends of the coupling halves 2a and 2b are provided with flanges 5a and 5b, respectively. The flange 5a at the opposite end of the first coupling halves 2a has a bolt inserting hole 20 of a particular shape, into which a bolt 10 can be inserted, as described in detail later.

On the other hand, the flange 5b at the opposite, free end of the second coupling halves 2b has a bolt inserting hole 6b having a usual circular hole in the same manner as the prior art shown in FIG. 1.

Figure 3A:
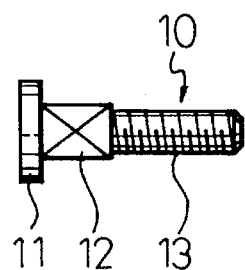
FIGS. 3A and 3B are side and front views, respectively, of a bolt which is used in the bolt-tightened type coupling according to this invention.
Figure 3B:
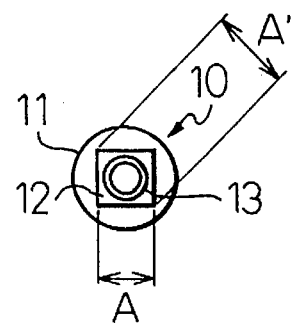
Figure 4:
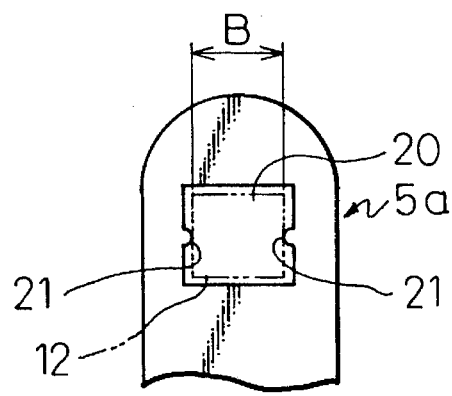
FIG. 4 is an enlarged plan view illustrating a bolt-inserting hole formed in a flange provided in the opposite end of the first coupling half.

In FIGS. 3A and 3b, the bolt 10 which is used in the bolt-tightened type coupling 1 of this invention is illustrated and a corresponding bolt-inserting hole 20 which can be formed in the flange 5a is shown in FIG. 4.

The bolt 10 comprises typically a head 11 and a shank having a neck portion 12 connected to the head 11, and a thread portion 13 extending from the neck portion 12. In this embodiment, the neck portion 12 has a square cross-section having a side length of A. On the other hand, as shown in FIG. 4, the bolt-inserting hole 20 has a corresponding square-shape and the opposite sides which are in parallel to the semi-circular coupling half 2a are provided at intermediate positions thereof with a corresponding pair of projections 21 and 21.

The dimension B between the tips of the pair of projections 21 and 21 is a little smaller than A (FIG. 3B). Such a bolt 10 is, beforehand, inserted into the bolt-inserting hole 20, as shown in FIG. 2, by any suitable tool, such as a plastic hammer (not shown). Thus, the opposite surfaces of the neck portion 12 of the bolt 10 are pushed by and fit tightly with the pair of projections 21 and 21, so that the bolt 10 can stably be held "semi-tightly" and prevented from falling out of the bolt inserting hole 20. Since the shapes of both the neck portion 12 of the bolt 10 and the bolt inserting hole 20 are square-shaped, the bolt 10 is prevented from turning with the nut 8, when the pair of coupling halves 2a and 2b are fastened together with the bolt 10 and nut 8.

Also, the bolt 10 is "semi-tightly" held in such a manner that the bolt 10 can be pivotably moved about the bolt inserting hole 20, particularly in the direction parallel to the semi-circular coupling half 2a, as shown by an arrow C in FIG. 2. This means that the bolt 10 held in the bolt inserting hole 20 is easily pivotable, but not easily moved in the axial direction. Therefore, after this coupling 1 is installed on a pipe (not shown) or the like, the bolt 10 can easily be inserted into the bolt inserting hole 6b of the second coupling half 2b, while the second coupling half 2b is pivotably moved about the connecting ring 4 toward the first coupling half 2a, as shown by an arrow D in FIG. 2.

In one embodiment, the diameter of this coupling 1 is about 80 mm, the thickness of the coupling halves 2a and 2b is about 2.0 mm, and the pitch circle of the bolt 10 is about 6 mm. In this case, the dimension of "tight-fit" (i.e., A–B) is about 0.05 to 0.10 mm. However, it should be noted that such dimensions are not limited on the basis of the type of the bolt or the shape of the bolt inserting hole.

Figure 5A:
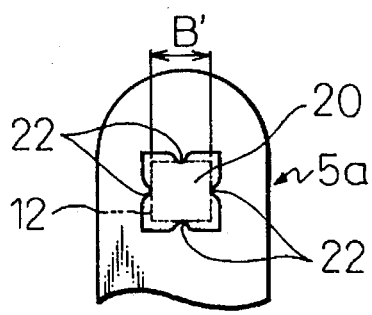
FIG. 5A and 5B are plan views of modified embodiments of the bolt-inserting hole shown in FIG. 4.
Figure 5B:
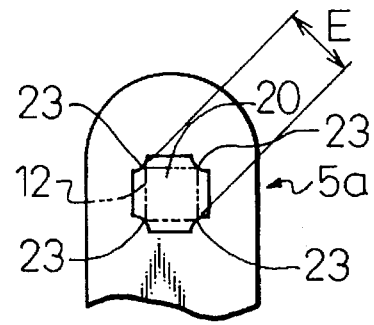

FIGS. 5A and 5B are modified embodiments of the bolt-inserting hole shown in FIG. 4. In FIG. 5A, the bolt-inserting hole 20 has a corresponding square-shape in the same manner as FIG. 4, but the respective opposite sides (i.e., four sides) are provided at intermediate positions thereof with corresponding four projections 22 facing toward each other.

In FIG. 5B, the bolt-inserting hole 20 has a corresponding square-shape the same as above, but the respective four corners are provided with projections 23 facing toward a central point of the bolt-inserting hole 20.

In these embodiments, a bolt 10 which may be same as the bolt in the previous embodiment and has a neck portion 12 of a square-shaped cross-section, as shown in FIGS. 3A and 3B, can be used. When such a bolt 10 is forcedly inserted into the bolt-inserting hole 20, the opposite projections 22 or 23 are brought into tightly contact and fit with the respective surfaces of the neck portion 12 of the bolt 10. Thus, so called "line contacts" or "point contacts" can be attained therebetween, so that the bolt is prevented from being damaged when it is forcedly inserted into the bolt inserting hole 20.

Thus, the durabilities of the bolt and the coupling halves can be improved. The bolt 10 can easily be inserted into the bolt inserting hole 20 without damaging the hole 20 and increasing the bolt inserting force. Also, in these embodiments, the dimension of "tight-fit" (i.e., A–B' or A'–E) may be suitably determined to be about 0.1 to 0.2 mm.

Figure 6A:
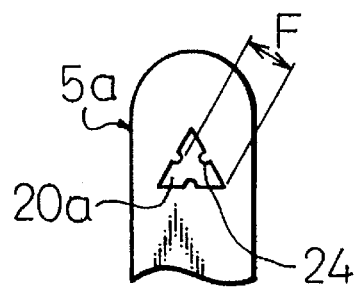
FIGS. 6A and 6B are plan views of further modified embodiments of a bolt-inserting hole.
Figure 6B:
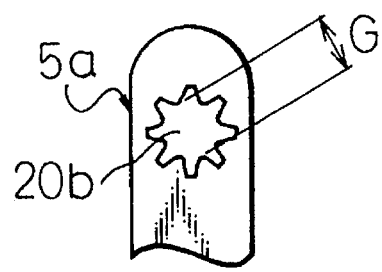

FIGS. 6A and 6B show further modified embodiments of a bolt-inserting hole. The bolt-inserting hole 20 may have a triangular-shape (FIG. 6A) as indicated at 20a, or a star-shape (FIG. 6B) as indicated at 20b. The triangular bolt-inserting hole 20a has three sides provided at intermediate positions thereof with projections 24.

Figure 7A:
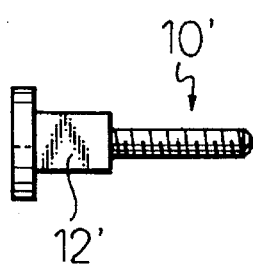
FIGS. 7A and 7B are side and front view, respectively of another bolt.
Figure 7B:
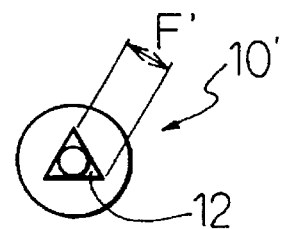

In the embodiment shown in FIG. 6A, a bolt 10' having a neck portion 12' of a triangular-shape cross-section (shown in FIGS. 7A and 7B) is forcedly inserted, beforehand, into the bolt-inserting hole 20a in the same manner as the above embodiments. The projections 24 of the bolt-inserting hole 20a are brought into tight contact and fit with the neck portion 12' of the bolt 10', so that "point contacts" can be attained therebetween.

Figure 8A:
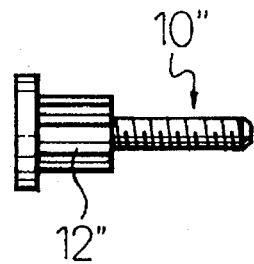
FIGS. 8A and 8B are side and front view, respectively, of still another bolt.
Figure 8B:
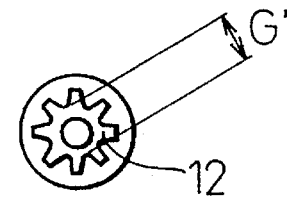

In the embodiment shown in FIG. 6B, a bolt 10" having a neck portion 12" of a star-shape cross-section (shown in FIGS. 8A and 8B) is forcedly inserted, beforehand, into the bolt-inserting hole 20b in the same manner as the above embodiments. The inner edges of the bolt-inserting hole 20b are brought into tight contact and fit with the neck portion 12" of the bolt 10" so that "line contacts" or "point contacts" can be attained therebetween.

In these embodiment shown in FIGS. 6A, 6B, 7A, 7B, 8A and 8B, the dimension of tight-fit (i.e., F'–F or G'–G) may be suitably determined to be about 0.05 to 0.10 mm.

As mentioned above, according to the present invention, when the bolt-tightened type couplings 1 are presented to the market, the bolt 10 may be, beforehand, mounted on the first coupling half 2a, so that bolt 10 can be held and prevented from falling out. Thus, when this coupling 1 is installed on a pipe (not shown) or the like, the bolt 10 can easily be inserted into the opposite bolt inserting hole 6b of the second coupling half 2b, without having to hold the head 11 (FIG. 2) of the bolt 10. Also, the bolt 10 is prevented from rotating with the nut 8, even if the nut 8 is rotated by an electric nut-screwing machine, sometimes called an "impact wrench" or a "nut driver".

Therefore the coupling of this invention is suitable for use in a mass-production line in a factory, such as in a turbo-charger assembling line where the turbo-charger is mounted on a vehicle body, to improve the productivity and increase the speed of the assembly operation.

It should be understood by those skilled in the art that the foregoing description relates to only a preferred embodiment of the disclosed invention, and that various changes and modifications may be made to the invention without departing from the spirit and scope thereof.

We claim:

1. A bolt-tightened coupling comprising:
   a pair of first and second semi-circular arc-shaped coupling halves having base ends that are pivotably connected to one another, so that said pair of coupling halves can be moved toward each other to a closed position and moved away from each other to an open position;

said first and second coupling halves having free ends opposite said base ends provided with first and second flanges, respectively, having first and second bolt inserting holes, respectively;

a bolt having a shank adapted to be inserted into said first bolt inserting hole and then into said second bolt inserting hole;

a nut adapted to be engaged with said shank of the bolt after said shank has been inserted into said first and second bolt inserting holes to secure the pair of coupling halves in its closed position; and said first bolt inserting hole having a plurality of spaced projections on an inner periphery thereof that project inwardly of the hole a distance sufficient to fit tightly with the shank of the bolt inserted through the first bolt inserting hole at spaced contact points and prevent the bolt from falling out of said first bolt inserting hole before the shank of the bolt has been engaged with said nut.

2. The coupling of claim 1, wherein said first bolt inserting hole of the first coupling half has a substantially square shape having opposite sides, a first pair of opposite sides extending parallel to sides of said first coupling half and having a pair of said projections at intermediate locations thereof that protrude inwardly toward each other and said shank of said bolt has a neck portion having a square cross-section, whereby said projections fit tightly with two opposite surfaces of said neck portion of the bolt to prevent the bolt from falling out of the first bolt inserting hole while permitting said bolt to be pivotably moved about said projections.

3. The coupling of claim 1, wherein said first bolt inserting hole of the first coupling half has a substantially square shape having four sides, each side having a projection protruding toward a projection on an opposite side at an intermediate location thereof, and said shank of said bolt has a neck portion having a square cross-section, whereby said four projections fit tightly with four surfaces of said neck portion of the bolt.

4. The coupling of claim 1, wherein said first bolt inserting hole of the first coupling half has a substantially square shape having four corners, each corner having a projection protruding toward the center of the hole, and said shank of said bolt has a neck portion having a square cross-section, whereby said projections fit tightly with respective corners of said square-shaped neck portion of the bolt.

5. The coupling of claim 1, wherein said first bolt inserting hole of the first coupling half has a substantially triangular shape having three sides, each side having at an intermediate location thereof a projection protruding toward the center of the hole, and said shank of said bolt has a neck portion having a triangular shape cross-section, whereby said projections of respective sides of said triangular-shaped hole fit tightly with the neck portion of the bolt.

6. The coupling of claim 1, wherein said first bolt inserting hole of the first coupling half has a substantially star shape forming a plurality of projections protruding toward the center of the hole, and said shank of said bolt has a neck portion having a complementary star shape cross-section, whereby said projections of said star-shaped hole fit tightly with the neck portion of the bolt.

* * * * *